(12) United States Patent
Hudlow et al.

(10) Patent No.: US 9,462,081 B2
(45) Date of Patent: Oct. 4, 2016

(54) CLOUD BASED VIRTUAL ENVIRONMENT VALIDATION

(75) Inventors: Gandolf G. Hudlow, San Marcos, CA (US); Eugene T. Bond, Laguna Niguel, CA (US); Adam J. Thompson, Henderson, NV (US)

(73) Assignee: IGT, Las Vegas, NV (US)

(*) Notice: Subject to any disclaimer, the term of this patent is extended or adjusted under 35 U.S.C. 154(b) by 237 days.

(21) Appl. No.: 13/449,206

(22) Filed: Apr. 17, 2012

(65) Prior Publication Data
US 2013/0275376 A1    Oct. 17, 2013

(51) Int. Cl.
G06F 17/30 (2006.01)
G06F 7/20 (2006.01)
H04L 29/06 (2006.01)
H04L 29/08 (2006.01)
G07F 17/32 (2006.01)

(52) U.S. Cl.
CPC .......... H04L 67/38 (2013.01); G07F 17/3241 (2013.01); H04L 67/10 (2013.01); H04L 67/34 (2013.01)

(58) Field of Classification Search
CPC .............................. G06F 7/20; G06F 17/30233
USPC .......................................... 707/639; 380/251
See application file for complete search history.

(56) References Cited

U.S. PATENT DOCUMENTS

| | | | | |
|---|---|---|---|---|
| 7,116,782 B2 * | 10/2006 | Jackson | ................ | G06F 21/123 380/251 |
| 7,734,599 B2 | 6/2010 | Hamada | | |
| 7,831,047 B2 * | 11/2010 | Rowe | ...................... | G06F 21/57 380/251 |
| 8,055,970 B1 | 11/2011 | Smith et al. | | |
| 8,788,841 B2 | 7/2014 | Aciicmez et al. | | |
| 2004/0259633 A1 * | 12/2004 | Gentles | ................... | G07F 17/32 463/29 |
| 2006/0035713 A1 * | 2/2006 | Cockerille | ............ | G07F 17/323 463/42 |
| 2007/0192329 A1 * | 8/2007 | Croft | ..................... | G06F 3/1415 |
| 2008/0076547 A1 * | 3/2008 | Bigelow | ............. | G07F 17/3241 463/29 |
| 2009/0193211 A1 | 7/2009 | Hu et al. | | |
| 2010/0298043 A1 * | 11/2010 | Bytnar | ..................... | G07F 17/32 463/24 |
| 2013/0097594 A1 * | 4/2013 | Swarna | ................... | G07F 17/32 717/168 |
| 2013/0179995 A1 * | 7/2013 | Basile | ..................... | G06F 21/10 726/32 |
| 2014/0024446 A1 | 1/2014 | Bigelow, Jr. et al. | | |

OTHER PUBLICATIONS

U.S. Appl. No. 13/449,221, "Cloud Based Virtual Environment Authentication," Hudlow, G., et al., filed Apr. 17, 2012.

* cited by examiner

*Primary Examiner* — Hosain Alam
*Assistant Examiner* — Robert F May
(74) *Attorney, Agent, or Firm* — Neal, Gerber & Eisenberg LLP

(57) ABSTRACT

Techniques for providing on-demand validation services for wager-based virtual machines deployed in a cloud based virtual environment. In some implementations, data sources store master deployment sets containing virtual machines. The master deployment sets may be deployed to component servers to provide a gaming related software services to remote client machines. The on-demand service takes snapshots of the virtual machines in the deployment and the virtual machines in the master deployment set. The snapshots are compared to ensure that important files in the master deployment set have not been improperly modified in the deployment. In some implementations, a secure hashing algorithm creates signatures for the snapshots prior to the comparison and the signatures are compared. The validation result may be sent to a remote client that requested the validation.

32 Claims, 10 Drawing Sheets

CLOUD BASED VIRTUAL ENVIRONMENT VALIDATION

TECHNICAL FIELD

The present disclosure relates generally to gaming machines, and more specifically, to methods and systems for providing on-demand deployment, management, authentication, and validation services for virtual machines deployed in a cloud-based on-demand service environment to provide wager-based game services and/or casino management services to remote machines.

BACKGROUND

Electronic gaming machines, in a standalone configuration, typically include hardware and software components. The hardware components include video display devices for displaying game play, user input devices for controlling game play, payment devices for accepting money or indicia of credit, and electronic components usually found in computer systems such as a processor, read only memory (ROM), random access memory (RAM), and one or more buses. The software components may include software for generating a game of chance game and software for casino management.

In order to be acceptable for casino use, the software components must be validated with secure methods. Therefore, the software on gaming machines has been designed to be static and monolithic pursuant to regulations to prevent cheating by the operator of the gaming machine. One solution that has been employed in the gaming industry has been to manufacture gaming machines that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. The software for casino management are subject to similar regulations, and therefore, have also used similar non-volatile memory techniques.

In addition to the standalone configuration described above, gaming machines may operate in server-client network configurations. Here, a server stores and executes the software components, sending video output to a client terminal for display. The client terminal receives user input and sends the input to the central server for game interaction and casino management interaction. In the server-client configuration, one or more servers may generate the game of chance from the EPROM or other form of non-volatile memory. The validation process is similar to the process for the standalone configuration, except the EPROM is at the server rather than the standalone gaming machine. One or more servers may further generate casino management services in a similar fashion.

A gaming machine may also be configured such that the software for generating the game of chance may run in a standalone configuration on the gaming machine while the casino management software runs in a server-client network configuration.

As gaming machine systems transition to utilize software components running on virtual machines on remote servers, there is a need to securely validate the software components on the virtual machines. As the server-client networks become cloud computing networks providing on-demand wager gaming and/or casino management services, there is a need to manage and validate versioned software components serving clients in different regulatory jurisdictions, all without disrupting live gaming operations.

SUMMARY

Various embodiments described or referenced herein are directed to systems and methods for providing on-demand deployment, management, authentication, and validation services for virtual machines deployed in a cloud-based on-demand service environment. The virtual machines may be deployed to provide wager-based game services and/or casino management services to remote machines.

In some implementations, a system provides for validation of a deployment of a master deployment set. The system includes one or more data sources, one or more component servers, and one or more validation servers.

The one or more data sources are configured to store one or more master deployment sets. A master deployment set includes one or more master virtual machines that are configured to have a master snapshot taken. A master deployment set further includes a manifest of files of regulatory importance.

The one or more component servers are configured to host at least one deployment of a master deployment set. The at least one deployment includes one or more virtual machines, wherein the one or more virtual machines are one instance of corresponding one or more master virtual machines within the master deployment set. The one or more virtual machines are further configured to have a deployment snapshot taken.

The one or more validation servers are configured to: generate, for each of a selected one or more virtual machines in the at least one deployment, a deployment snapshot, the deployment snapshot including a first set of files; generate, for each of a corresponding one or more master virtual machines in the master deployment set corresponding with the at least one deployment, a master snapshot, the master snapshot including a second set of files; determine, for each of the selected one or more virtual machines in the at least one deployment, a first selection of files from the deployment snapshot, the first selection of files determined by using the manifest of files of regulatory importance; determine, for each of the corresponding one or more master virtual machines in the master deployment set corresponding with the at least one deployment, a second selection of files from the master snapshot, the second selection of files determined by using the manifest of files of regulatory importance; and determine a validation result for the at least one deployment by comparing, for each of the selected one or more virtual machines in the at least one deployment and each of the corresponding one or more master virtual machines in the master deployment set corresponding with the at least one deployment, the first selection of files with the second selection of file.

In some implementations, the one or more validation servers are configured to determine a validation result for the at least one deployment by: determining a hashing order, the hashing order determined by using the manifest of files of regulatory importance; generating a validation seed; creating a first signature using the validation seed for each of the selected one or more virtual machines in the at least one deployment, wherein the creating the first signature using the validation seed includes hashing, with a secure hashing algorithm, the first selection of files in the hashing order; creating a second signature using the validation seed for each of the corresponding one or more master virtual machines in the master deployment set corresponding with the at least one deployment, wherein the creating the second signature using the validation seed includes hashing, with the secure hashing algorithm, the second selection of files in the hashing order; and determining the validation result for the at least one deployment by comparing the first signature with the second signature.

In some implementations, the one or more validation servers are configured to determine a validation result for the at least one deployment by: generating a validation seed; creating, for each of the selected one or more virtual machines in the at least one deployment, a signature for each file in the first selection of files using the validation seed, wherein the creating the signature for each file in the first selection using the validation seed includes hashing with a secure hashing algorithm the first selection of files; creating, for each of the one or more corresponding master virtual machines in the master deployment set corresponding with the at least one deployment, a signature for each file in the second selection of files using the validation seed, wherein the creating the signature for each file in the second selection of files using the validation seed includes hashing with a secure hashing algorithm the second selection of files; and determining the validation result for the at least one deployment by comparing, for each of the one or more selected virtual machines in the at least one deployment and the corresponding one or more master virtual machines in the master deployment set corresponding with the at least one deployment, the signature for each file in the first selection of files with the corresponding signature for each file in the second selection of files.

In some implementations, the one or more validation servers are further configured to use a secure hashing algorithm to determine the validation result for the at least one deployment.

In some implementations, the one or more selected virtual machines in the at least one deployment and the one or more corresponding master virtual machines in the master deployment set corresponding with the at least one deployment include one or more casino management software components.

In some implementations, the master deployment set represents one version of the one or more casino management software components, the master deployment set indexed by a manifest of master deployment sets, and the manifest of master deployment sets stored in the one or more data sources.

In some implementations, the one or more component servers are further configured to provide a casino management service to a gaming machine client terminal.

In some implementations, the one or more selected virtual machines in the at least one deployment and the one or more corresponding master virtual machines in the master deployment set corresponding with the at least one deployment include one or more gaming software components.

In some implementations, the master deployment set represents one version of the one or more gaming software components. The master deployment set is indexed by a manifest of master deployment sets. The manifest of master deployment sets is stored in the one or more data sources.

In some implementations, the one or more component servers are configured to provide a gaming service to a gaming machine client terminal.

In some implementations, the manifest of files of regulatory importance is configured to incorporate jurisdictional data for one or more jurisdictions. This allows the master deployment set to be deployed to the one or more component servers that provide a component service to one or more gaming machine client terminals in the one or more jurisdictions.

In some implementations, the one or more validation servers are further configured to: send instructions to a client terminal including a display device and an input device, the instructions providing a user interface, the user interface configured to receive input from the input device and be displayed on the display device; receive input from the user interface of the client terminal, the input indicating a request for validation of the selection of the one or more virtual machines in at least one deployment; and send the validation result to the client terminal for display.

In some implementations, the one or more validation servers are further configured to, responsive to determining the validation result to be invalid, send a list of files to the client terminal for display, the list of files including files causing the deployment to be invalid.

In some implementations, the one or more validation servers are further configured to display the validation result on the user interface of the client terminal, wherein the user interface is a graphical user interface.

In some implementations, the one or more validation servers are further configured to store the validation result in the one or more data sources.

In some implementations, the one or more validation servers are further configured to send the validation result to a regulatory entity or an administrator.

In some implementations, the one or more validation servers are further configured to: receive input from a client terminal indicating a request for deployment of a master deployment set; and deploy the master deployment set on the one or more component servers responsive to receiving the input indicating a request for deployment of the master deployment set.

In some implementations, the one or more validation servers are further configured to, responsive to determining the validation result to be invalid, disable one or more virtual machines in the deployment causing the validation result to be invalid.

In some implementations, the one or more validation servers are further configured to, responsive to determining the validation result to be invalid, redeploy one or more virtual machines in the deployment causing the validation result to be invalid.

In some implementations, the one or more validation servers are further configured to display a success rate or a failure rate for one or more deployments of the master deployment set on the user interface of the client terminal.

In some implementations, a computer-implemented method provides for the validation of a deployment of a master deployment set. The method includes generating, for each of a selected one or more virtual machines in a deployment, a deployment snapshot. The deployment snapshot includes a first set of files. The method further includes generating, for each of a corresponding one or more master virtual machines in a master deployment set, a master snapshot. The master snapshot including a second set of files.

The deployment includes one or more virtual machines deployed to one or more component servers. Each of the selected one or more virtual machines in the deployment are an instance of each of the corresponding one or more master virtual machines in the master deployment set. The master deployment set is stored in one or more data sources communicatively coupled with the one or more validation servers. The master deployment set further including a manifest of files of regulatory importance.

The method further includes determining, for each of the selected one or more virtual machines, a first selection of files from the deployment snapshot. The first selection of files may be determined by using the manifest of files of regulatory importance.

The method further includes determining, for each of the corresponding one or more master virtual machines, a second selection of files from the master snapshot. The second selection of files may also be determined by using the manifest of files of regulatory importance.

The method further includes determining a validation result for the deployment by comparing, for each of the selected one or more virtual machines and each of the corresponding master virtual machines, the first selection of files with the second selection of files.

In some implementations, determining the validation result includes: determining with the one or more microprocessors a hashing order, the hashing order determined by using the manifest of files of regulatory importance; generating a validation seed with the one or more microprocessors; creating a first signature using the validation seed for each of the selected one or more virtual machines, wherein the creating the first signature using the validation seed includes hashing, with the one or more microprocessors configured to execute a secure hashing algorithm, the first selection of files in the hashing order; creating a second signature using the validation seed for each of the corresponding one or more master virtual machines, wherein the creating the second signature using the validation seed includes hashing, with the one or more microprocessors configured to execute the secure hashing algorithm, the second selection of files in the hashing order; and determining the validation result for the deployment by comparing, for each of the selected one or more virtual machines and each of the corresponding one or more master virtual machines and with the one or more microprocessors, the first signature with the second signature.

In some implementations, determining the validation result for the deployment includes: generating a validation seed with the one or more microprocessors; creating, for each of the one or more selected virtual machines and with the one or more microprocessors configured to execute a secure hashing algorithm, a signature for each file in the first selection of files using the validation seed, wherein the creating the signature for each file in the first selection using the validation seed includes hashing the first selection of files; creating, for each of the corresponding one or more master virtual machines and with the one or more microprocessors configured to execute the secure hashing algorithm, a signature for each file in the second selection of files using the validation seed, wherein the creating the signature for each file in the second selection of files using the validation seed includes hashing the second selection of files; and determining the validation result for of the deployment by comparing, for each of the selected one or more virtual machines and each of the corresponding one or more master virtual machines and with the one or more microprocessors, the signature for each file in the first selection of files with the corresponding signature for each file in the second selection of files.

In some implementations, determining the validation result for the deployment further includes using a secure hashing algorithm.

In some implementations, the one or more selected virtual machines and the corresponding one or more master virtual machines include one or more casino management software components.

In some implementations, the master deployment set represents one version of the one or more casino management software components. The master deployment set is indexed by a manifest of master deployment sets. The manifest of master deployment sets stored in the one or more data sources.

In some implementations, the method further includes providing a casino management service from the one or more component servers to a gaming machine client terminal.

In some implementations, the one or more selected virtual machines and the corresponding one or more master virtual machines include one or more gaming software components.

In some implementations, the master deployment set represents one version of the one or more gaming software components. The master deployment set is indexed by a manifest of master deployment sets. The manifest of master deployment sets is stored in the one or more data sources.

In some implementations, the method further includes providing a gaming service from the one or more component servers to a gaming machine client terminal.

In some implementations, the manifest of files of regulatory importance is configured to incorporate jurisdictional data for one or more jurisdictions, thereby enabling the master deployment set be deployed to the one or more component servers providing a component service to one or more gaming machine client terminals in the one or more jurisdictions.

In some implementations, the method further includes sending instructions from one or more validation servers to a client terminal. The client terminal includes a display device and an input device. The instructions provide a user interface configured to: receive input from the input device and be displayed on the display device. The method further includes receiving input from the user interface of the client terminal at the one or more validation servers. The input indicates a request for validation of the selection of the one or more virtual machines in a deployment. The method further includes sending the validation result to the client terminal for display.

In some implementations, the method further includes, responsive to determining the validation result to be invalid, sending a list of files to the client terminal for display, the list of files including files causing the deployment to be invalid.

In some implementations, the method further includes displaying the validation result on the user interface of the client terminal, wherein the user interface is a graphical user interface.

In some implementations, the method further includes storing the validation result in the one or more data sources.

In some implementations, the method further includes sending the validation result to a regulatory entity or an administrator.

In some implementations, the method further includes: receiving input at the one or more validation servers from a client terminal indicating a request for deployment of a master deployment set; and deploying the master deployment set on the one or component servers responsive to receiving the input indicating a request for deployment of the master deployment set.

In some implementations, the method further includes, responsive to determining the validation result to be invalid, disabling one or more virtual machines in the deployment causing the validation result to be invalid.

In some implementations, the method further includes, responsive to determining the validation result to be invalid, redeploying one or more virtual machines in the deployment causing the validation result to be invalid.

In some implementations, the method further includes displaying a success rate or a failure rate for one or more deployments of the master deployment set on the user interface of the client terminal.

BRIEF DESCRIPTION OF THE DRAWINGS

The included drawings are for illustrative purposes and serve only to provide examples of possible structures and process steps. These drawings in no way limit any changes in form and detail that may be made to implementations by one skilled in the art without departing from the spirit and scope of the disclosure.

DETAILED DESCRIPTION

Figure 1:
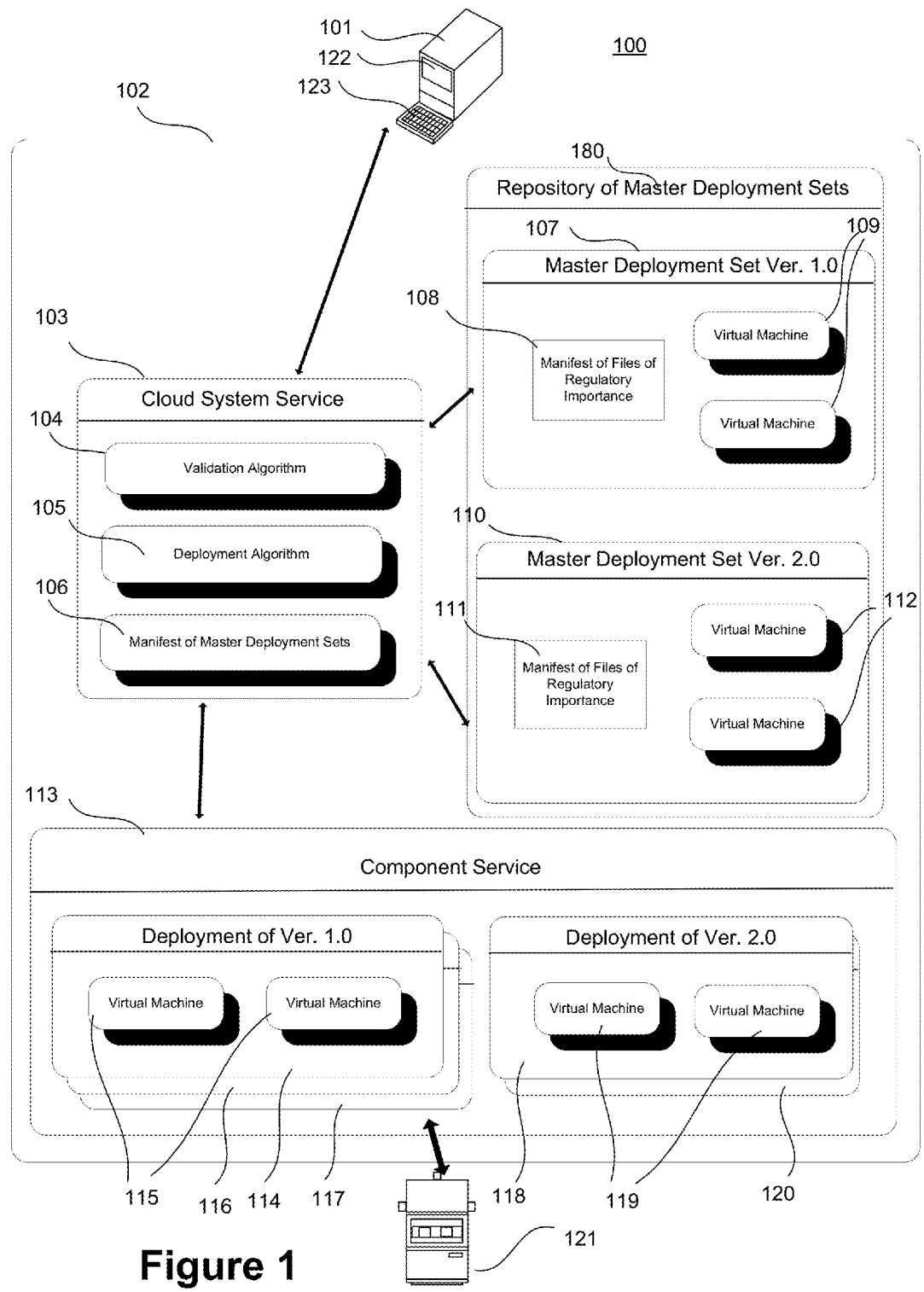
FIG. 1 shows a block diagram of modules within a cloud computing network, according to some implementations.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the invention as defined by the appended claims.

The disclosed subject matter provides systems and methods for providing a cloud-based on-demand service environment that provides component services to gaming machines and other remote client machines. The remote client terminals may be, in some examples, gaming machines in various jurisdictions and owned by various gaming establishments or other entities In some implementations, master deployment sets containing virtual machines are stored in one or more data sources in the cloud-based on-demand service environment. The virtual machines may include software that provides wager-based games and/or casino management services (collectively referred to as "component services"). Once deployed to a server (or "component servers"), the virtual machines are capable of executing the software to provide the component services to remote client terminals.

In some implementations, the component services may be displayed on a display device of the remote client machine along with local content provided by the remote client machine. For instance, a user may play a wager game in a first window controlled by the remote client machine while also interacting with a second window controlled/provided by the component service.

To deploy a master deployment set, the master deployment set and its virtual machines may be cloned. The cloned copies may be deployed to one or more component servers in the cloud-based on-demand service environment.

In some implementations, the cloud-based on-demand service environment also provides a cloud system service. The cloud system service provides on-demand or automated management and validation services for deployed virtual machines.

Deployed virtual machines may be validated against the virtual machines in the master deployment set to ensure the deployed virtual machines are intact and have not been corrupted or modified.

In some implementations, the cloud system service allows an administrator, technician, manager or other authorized user to perform the deployment of master deployment sets and the validation of deployments a remote client. In some implementations, the validation process largely runs unattended. Here, the user may be notified when a validation has failed and further steps may be performed either manually or automatically to correct the invalid deployment.

In some implementations, the cloud system service allows an authorized user to perform an authentication of a deployment. The primary goal of authentication is to ensure that deployed virtual machines are utilizing software that has been approved to provide component services to remote client machines in specific gaming jurisdictions. The term "presently approved" means the regulatory agency currently authorizes the software. A regulatory agency often chooses to revoke licenses for previously submitted software when issues are found and new software is submitted to replace it, or at its own volition. In some implementations, the state of approvals of master deployment sets may be tracked to ensure that only presently approved software is deployed.

In some implementations, the master deployment sets are stored in a repository of regulatory approved master deployment sets. The cloud-based on-demand service environment may provide for the storing and maintaining of the repository, as may be required by various regulations. In one example, a repository manager, administrator, or other authorized user may use the cloud system service to add, delete, revise, or otherwise maintain the repository.

The component services and cloud system service are "on-demand" services in that the cloud-based on-demand service environment may provide them to client terminals without requiring the need for specialized software being installed on the client terminal. Instead, the client terminals may access these on-demand services utilizing a web browser pointed to the cloud-based on-demand service environment via a uniform resource locator (URL) or internet protocol (IP) address.

Although the current description primarily describes deployment, management and validation of casino-related virtual machines in a cloud-based on-demand service environment, some implementations of the disclosed subject matter apply equally to deployment, management and validation of other types of virtual machines.

FIG. 1 shows a block diagram of modules within a cloud computing network 100, according to some implementations. The cloud computing network includes the cloud-based on-demand service environment 102 that provides the cloud system service 103 to a client terminal 101.

In some implementations, the cloud system service may include a validation algorithm 104 for validating a deployment, a deployment algorithm 105 for deploying a master deployment set, and a manifest of master deployment sets 106. In some implementations, the validation algorithm 104 includes a secure hashing algorithm and a validation seed generator.

The manifest of master deployment sets 106 may contain a listing of master deployment sets that the cloud system service 103 may access. In the example shown in FIG. 1, the cloud system service 103 contains two master deployment sets 107 and 110. The master deployment sets 107 and 110 may further be listed in the manifest of master deployment sets 106. In some implementations, the two master deployment sets may represent different versions of software on the virtual machines within the master deployment sets. For instance, master deployment set 107 corresponds with Version 1.0 while master deployment set 110 corresponds with Version 2.0.

In some implementations, the master deployment sets are stored in a repository of regulatory approved master deployment sets 180. The repository of regulatory approved master deployment includes one or more master deployment sets that have received regulatory approval in one or more jurisdictions. For instance, the repository of regulatory approved master deployment sets 180 includes the master deployment sets 107 and 110. In some examples, regulatory approved software may incorporate jurisdictional information for the jurisdiction in which the software has been approved.

Each master deployment set further includes a manifest of files of regulatory importance and one or more virtual machines. For example, the master deployment set 107 includes a manifest of files of regulatory importance 108 and virtual machines 109. Similarly, the master deployment set 110 includes a manifest of files of regulatory importance 111 and master virtual machines 112.

The manifest of files of regulatory importance 108 and 111 includes a list of files that under wager gaming regulatory rules cannot change when the master deployment sets 107 and 110 are deployed. In some implementations, each deployed instance of a master deployment set provides the component service 113 to different regulatory jurisdictions with different validation requirements. In one example, the manifest of files of regulatory importance 108 may be configured to incorporate jurisdictional regulatory data for at least three jurisdictions corresponding to the locations served by the deployments 114, 116, and 117, thereby enabling the cloud computing network 100 to provide the component service 113 to the gaming machine client terminal 121 located in one of the three jurisdictions.

In the example shown in FIG. 1, the master deployment set version 1.0 107 has three deployed instances 114, 116, and 117. The master deployment set Version 2.0 110 has two deployed instances 118 and 120. Each deployed instance includes virtual machines corresponding with virtual machines in the master deployment set. For instance, the deployment 114 includes virtual machines 115 corresponding with virtual machines 109 in the master deployment set Version 1.0 107. The Deployment 118 includes virtual machines 119 corresponding with master virtual machines 112 in the master deployment set Version 2.0 110.

In some implementations, the one or more virtual machines in the deployment and the corresponding one or more master virtual machines in the master deployment set include gaming software components for generating the wager game, operating the wager game, generating random numbers, or any combination thereof.

In some implementations, the one or more virtual machines in the deployment and the corresponding one or more master virtual machines in the master deployment set include casino management software components. Examples of casino management software components include components for player tracking, ticketing, cashless transfers, slot accounting, progressives, bonusing, patron management, machine accounting, or any combination thereof.

In some implementations, the one or more virtual machines in the deployment and the corresponding one or more master virtual machines in the master deployment set include both gaming software components and casino management components.

As discussed above, a master deployment set may be deployed to one or more component servers to provide the component service 113. When the one or more virtual machines in the deployment and the corresponding one or more master virtual machines in the master deployment set include gaming software components, the component service may also be referred to as a "gaming service." When the one or more virtual machines in the deployment and the corresponding one or more master virtual machines in the master deployment set include casino management software components, the component service may also be referred to as a "casino management service."

Figure 2:
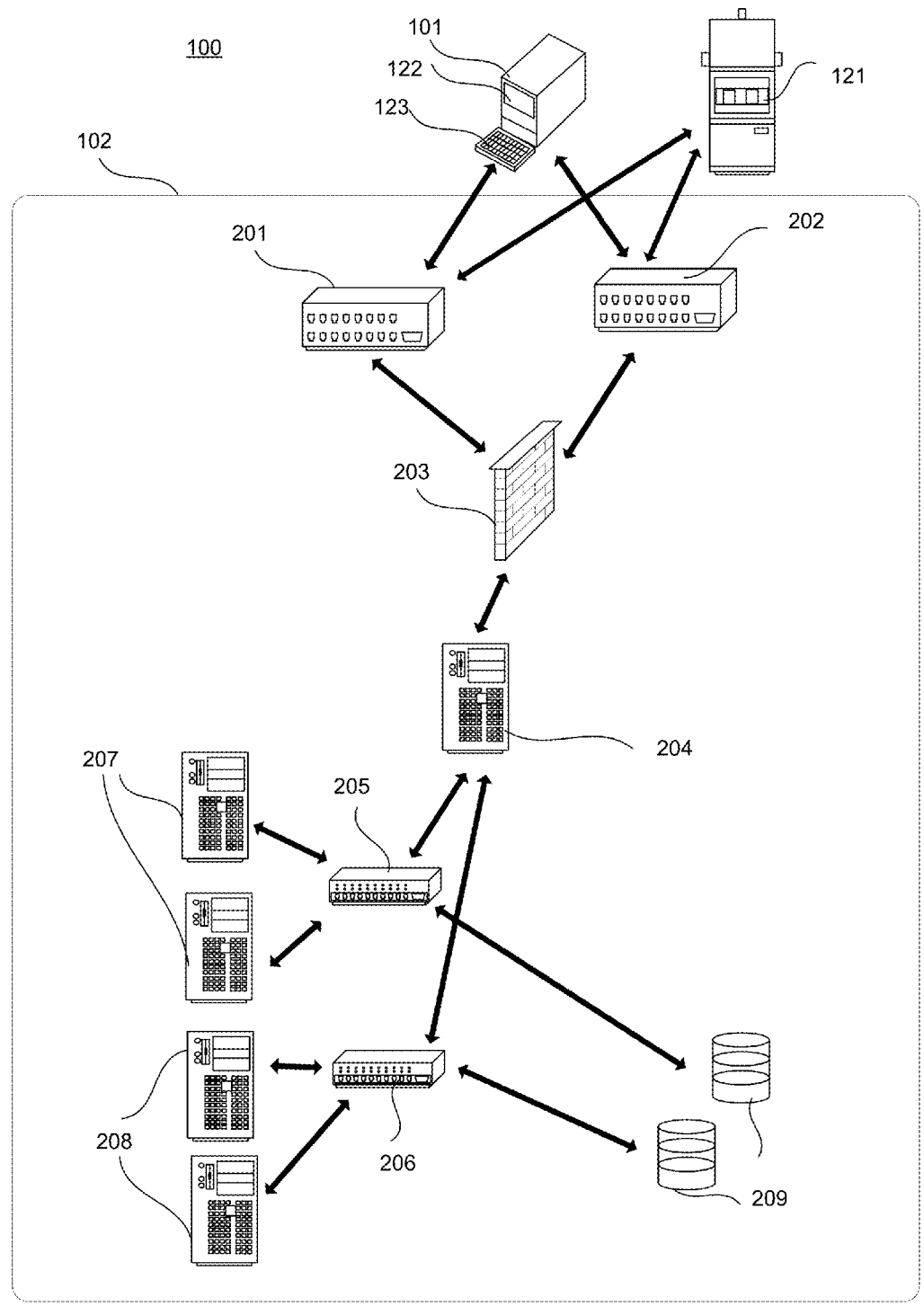
FIG. 2 shows a system diagram of the architectural components of a cloud computing network, configured according to some implementations.

FIG. 2 shows a system diagram of the architectural components of a cloud computing network, configured according to some implementations. A client terminal 101 and a gaming machine client terminal 121 communicate with the cloud-based on-demand service environment 102 via one or more edge routers 201 and 202 and a firewall 203. A load balancer 204 distributes server load to one or more validation servers 207 and one or more component servers

208 via server switches 205 and 206. Data sources 209 communicate with the validation servers 207 and the component servers 208 via server switches 205 and 206.

The client terminal 101 may be operated by an authorized user to access the cloud system service. In some implementations, client terminal 101 is an apparatus with a display device 122, an input device 123, and a web browser communicatively coupled with an internet connection. The client terminal in some implementations may be a computer, a laptop, a tablet, or a smart phone. In some implementations, the client terminal 101 may be located within cloud-based on-demand service environment 102 with the cloud system service 103 running as a local application. For example, the client terminal 101 may be a local terminal attached with one of the validation servers 207.

The gaming machine client terminal 121 may be owned by a customer or subscriber of one or more of the component services. One example of a customer or subscriber may include a gaming establishment. The gaming machine client terminal may be operated by a patron of the gaming establishment to access the wager gaming service. In some implementations, the gaming machine client terminal may be a computing device or gaming machine located on the floor of the gaming establishment. In other implementations, the gaming machine client terminal may be a desktop, a mobile computing device, a laptop, PDA, a tablet or a smart phone. In some implementations, the gaming machine client terminal is an apparatus with a display device, an input device, and a web browser communicatively coupled with an internet connection.

The gaming machine client terminal 121 may further operate in various configurations depending on the implementation of the component service. In some examples, if the component service is the casino management service, the gaming machine client terminal may be configured to operate wager games in a standalone configuration or in a client/server configuration (i.e. the wager game is not provided by the component service).

In other examples, if the component service is the gaming service, the gaming machine client terminal may be configured to operate casino management software in a standalone configuration or in a client/server configuration (i.e. the casino management software is not provided by the component service).

In other examples, the component service includes the gaming service and the casino management service. The gaming service and the casino management service may be provided to the gaming machine client terminal without requiring the need for specialized software being installed on the gaming machine client terminal.

The edge routers 201 and 202 and the firewall 203 ensure that only authorized remote devices may access the cloud-based on-demand service environment 102. In some implementations, the edge routers 201 and 202 employ the Border Gateway Protocol for internet packet routing. The edge routers may include a table of IP networks or prefixes which block unauthorized internet traffic. The firewall 203 may be configured with predetermined settings to protect the inner components of the cloud-based on-demand service environment 102, such as the validation servers 207, the component servers 208, and the data sources 209. The firewall 203 may also act as a packet filter, an application gateway, a stateful filter, a proxy server, or any other type of firewall.

The load balancer 204 distributes server load between the one or more validation servers 207 and the one or more component servers 208. The load balancer 204 helps the cloud-based on-demand service environment 102 achieve optimal resource utilization, maximize throughput, minimize response time, and avoid overload. Using multiple servers with load balancing, instead of a single server, may increase reliability through redundancy. The load balancer 204 may include multilayer switches to analyze and forward traffic to the desired location.

The validation servers 207 host the cloud system service 103 shown in FIG. 1. Although two validation servers are shown in FIG. 2, any number of physical servers can be configured to provide the cloud system service 103 depending on the factors such as cost and volume of traffic. The component servers 208 host the component service 113 shown in FIG. 1. Although two component servers are shown in FIG. 2, any number of physical servers can be configured to provide the component service 103 depending on the factors such as cost and volume of traffic.

The server switch 205 facilitates communication between the validation servers 207 and the client terminal 101, and the validation servers 207 and the data sources 209. The server switch 206 facilitates communication between the component servers 208 and the gaming machine client terminal 121, and the component servers 208 and the data sources 209. Although the implementation shown in FIG. 2 uses different servers 207 and 208 and different server switches 205 and 206 for the cloud system service and the component service respectively, those of skill in the art will appreciate that other implementations are possible within the scope and spirit of the disclosed subject matter. For example, both services may be hosted on a single server or same sets of servers and facilitated by the same server switch or same sets of server switches. Those of skill in the art will appreciate that numerous physical server configurations can be utilized to provide the component service 113 and the cloud system service 103 depending on factors such as cost and volume of traffic.

The data sources 209 are configured to store master deployment sets, such as the master deployment sets 107 and 110 in FIG. 1. In some implementations, the data sources 209 are components of a cloud-based on-demand database system shared by multiple subscribers of the component service 113, other on-demand services that may be provided by the cloud-based on-demand service environment 102, and local applications within the cloud-based on-demand service environment 102. The on-demand database system may employ a multi-tenant approach, a virtualized approach, or any other type of database approach.

Figure 3:
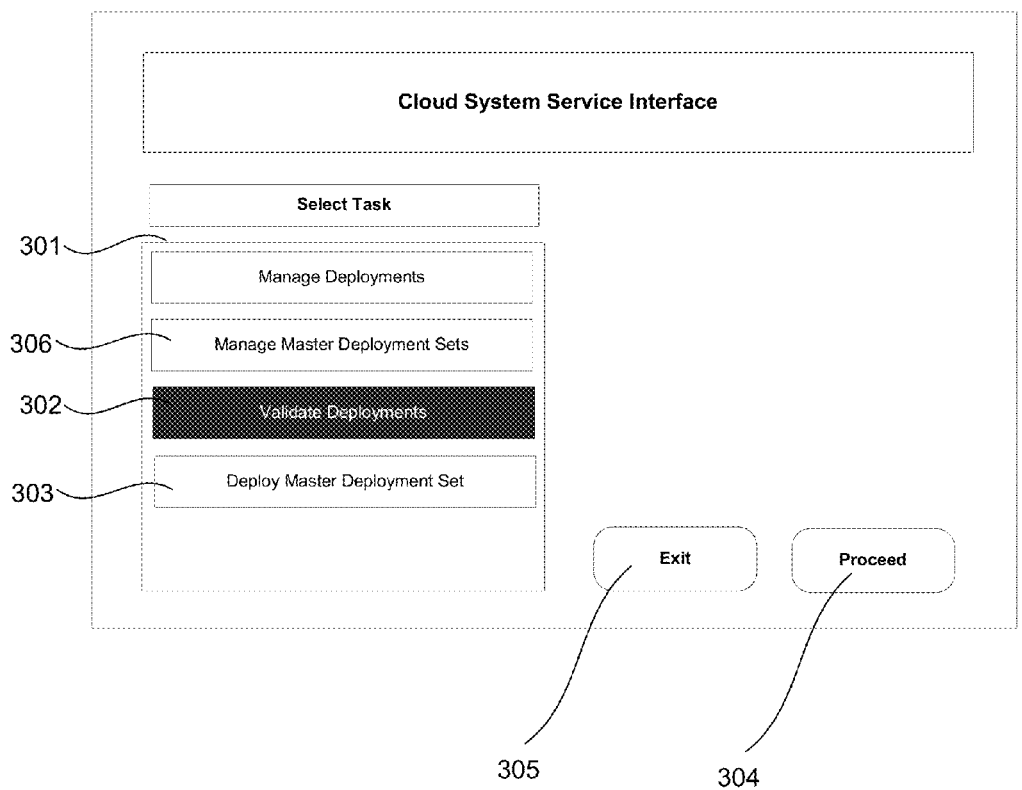
FIG. 3 shows a cloud system service main interface, according to some implementations.

FIG. 3 shows an example cloud system service main interface 300, according to some implementations. In some implementations, the cloud system service main interface 300 is a graphical user interface accessible by the client terminal 101 shown in FIG. 2 as an on-demand service. In some implementations, an authorized user may request the cloud system service from the one or more validation servers 207 utilizing the web browser of the client terminal.

The cloud system service main interface 300 includes a task selection menu 301. The task selection menu may include a selectable list of tasks such as validate deployments 302, deploy master deployment set 303, and manage master deployment sets 306. The authorized user may perform a task by selecting the appropriate box within task selection menu 301 and choosing a proceed button 304. The authorized user may also choose to exit the cloud system service main interface 300 by choosing an exit button 305.

Figure 4A:
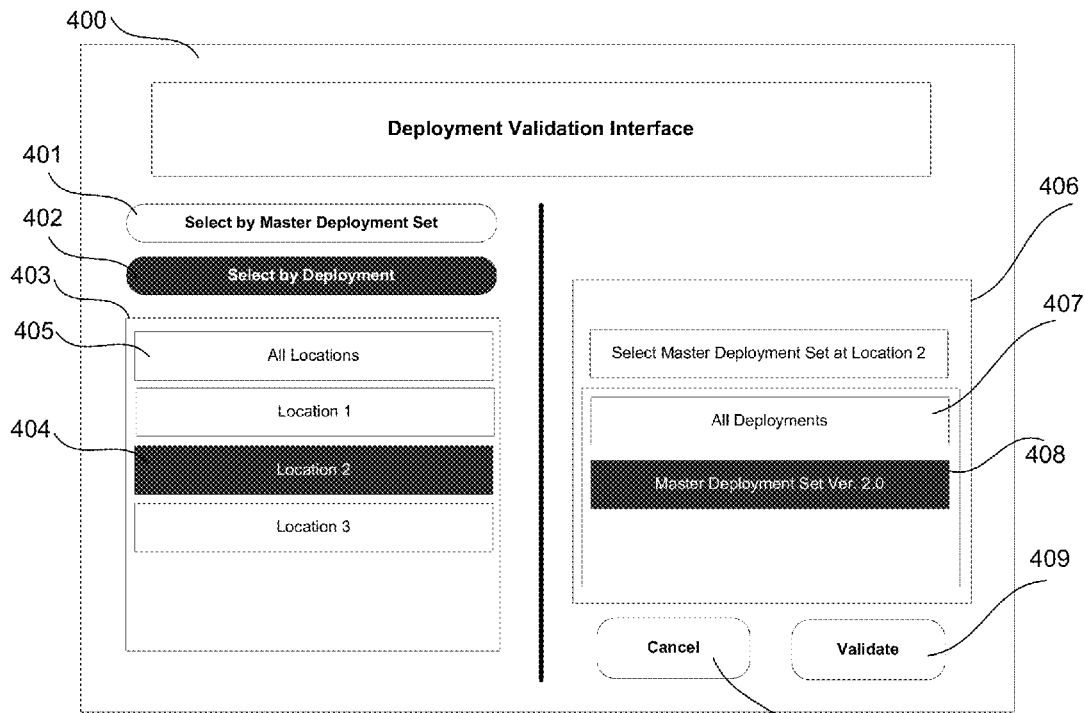
FIGS. 4A and 4B show a deployment validation interface, according to some implementations.
Figure 4B:
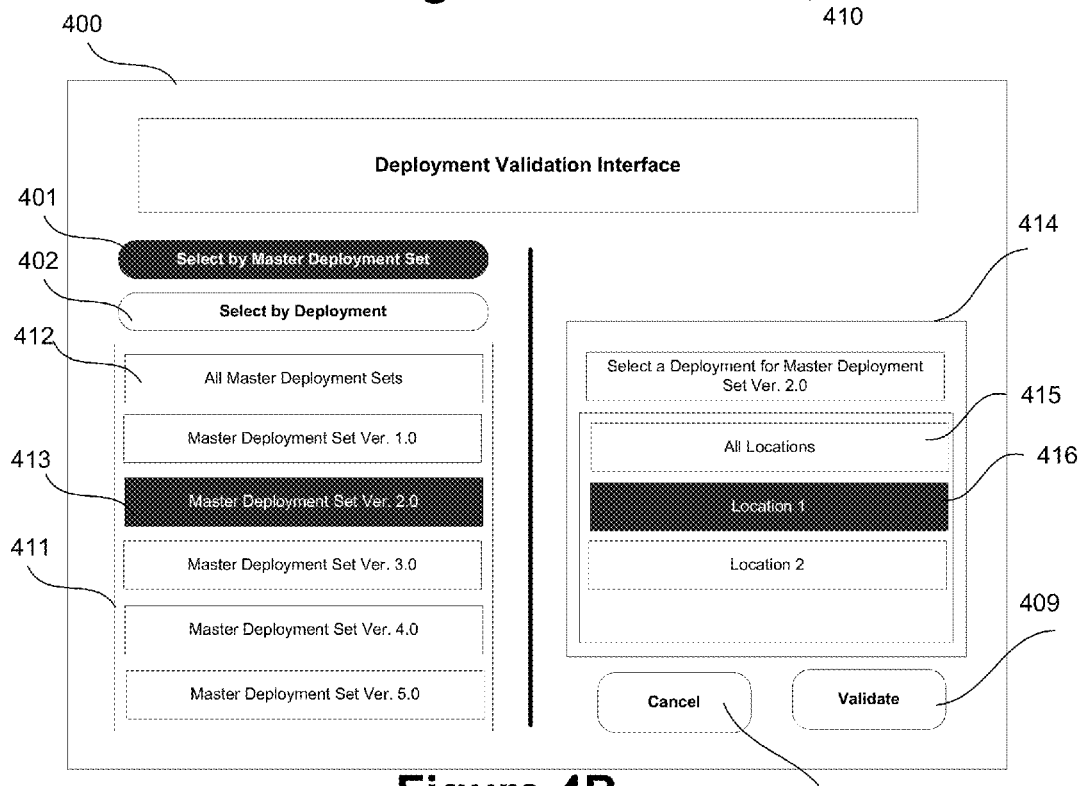

FIGS. 4A and 4B show an example of a deployment validation interface 400, according to some implementations. In some implementations, the deployment validation interface 400 displays on the client terminal 101 responsive to the authorized user selecting validate deployments 302 on task selection menu 301 and choosing the proceed button 304.

In some implementations, the authorized user may perform a validation of a deployment by first choosing a deployment. The authorized user begins by choosing select by deployment 402, which populates deployment list 403 as shown in FIG. 4A. Deployment list 403 includes a list of locations containing deployments. The locations may correspond with different regulatory jurisdictions, different subscribers of the component services, different component servers, or different gaming establishment facilities. The authorized user may select a location by choosing, for example, Location 2 404. Responsive to the authorized user selecting the location, a master deployment set list 406 populates with a list of master deployment sets deployed at the selected location. In the example shown in FIG. 4A, the authorized user has selected master deployment set Version 2.0 408. After making the selections, the authorized user may then choose a validate button 409 to validate master deployment set Version 2.0 deployed at Location 2. Although only master deployment set version 2.0 is shown as a selection option in FIG. 2A, location 2 may contain more than one master deployment set, and in that case, all master deployment sets deployed at location 2 will populate in master deployment set list 406 responsive to the authorized user selecting location 2.

In some implementations, the authorized user may validate various combinations of deployments in one validation. For example, the authorized user may validate all deployments on validation servers 207 shown in FIG. 2 by selecting all locations 405 and all deployments 407. In another example, the authorized user may validate all deployments within a single location, such as location 2, by selecting location 2 404 and all deployments 407. In another example, the authorized user may validate all deployments of a master deployment set version, such as version 2.0, by selecting all locations 405 and master deployment set version 2.0 408.

In some implementations, the authorized user may perform the validation by first selecting a master deployment set. The authorized user begins by choosing select by master deployment set 401 as shown in FIG. 4B, which populates master deployment set list 411. Master deployment set list 411 includes a listing of all master deployment sets within the data sources 209 shown in FIG. 2. The authorized user may select a master deployment set by choosing, for example, master deployment set version 2.0 413. Responsive to the authorized user selecting the master deployment set, master deployment set list 411 populates with a list of locations where the master deployment set version 2.0 is deployed. In FIG. 4B, the authorized user has selected location 1 416. After making the selections, the authorized user may then choose validate button 409 to validate master deployment set version 2.0 deployed at location 2. Although only location 1 and location 2 are shown as selection options in FIG. 4B, master deployment set version 2.0 may be deployed to more than the two locations, and all locations containing deployments of master deployment set version 2.0 will populate in deployment location list 414 responsive to the authorized user selecting master deployment set version 2.0 413.

In some implementations, the authorized user may validate various combinations of deployments in one validation. For example, the authorized user may validate all master deployment sets by selecting all master deployment sets 412 and all locations 415. In another example, the authorized user may validate all master deployments sets within a single location, such as location 1, by selecting all master deployment sets 412 and location 1 416. In another example, the authorized user may validate all deployments of a master deployment set version, such as version 2.0, by selecting master deployment set version 2.0 413 and all locations 415.

In some implementations, the authorized user may exit the deployment validation interface 400 by choosing cancel button 410. The authorized user may be returned to the cloud system service main interface 300 shown in FIG. 3.

The deployment validation interface 400 described above is merely an example of how a deployment may be selected for validation. In some implementations, virtual machines in the deployment may be selected individually. In some implementations, any set of virtual machines may be selected for a single validation.

Returning to FIG. 3, the authorized user may further manage master deployment sets with the cloud system service. In some implementations, the authorized user may manage master deployment sets by selecting manage master deployment sets 306 in the cloud system service main interface 300.

In some implementations, management of master deployment sets may include performing updates to the repository of master deployment sets 180 or the manifest of master deployment sets 106. The manifest of master deployment sets may include a listing of master deployment sets that are currently approved by regulators. A gaming regulatory agency often chooses to revoke licenses for previously submitted software when issues are found and new software is submitted to replace it, or at its own volition. The manifest of master deployment sets may be used to track the state of approvals of master deployment sets in the repository of regulatory approved master deployment sets 180 and ensures that only presently approved software deployed.

In some implementations, unapproved master deployment sets may be flagged or logged and the authorized user may be notified. A regulator may also be notified when required or useful. If an unapproved master deployment set has been deployed, the deployment may be rolled back. This can be achieved by deploying an older version of the master deployment set to the one or more component servers. In one example, the cloud-based on-demand service environment 102 may be configured to automatically roll back a deployed master deployment set once it has been flagged as unapproved.

In some implementations, all repository management functions (including deployment and validation of master deployment sets) are restricted to a limited set of authorized users via configurable user permissions. Examples of authorized users may include regulators, administrators, gaming establishment managers, cloud-based on-demand system operators, technicians, or the like. These authorized users may have various additional permissions to maintain the repository such as adding a master deployment set to the repository, deleting a master deployment set from the repository, editing a master deployment set, logging and reporting any changes to the repository, and editing the manifest of master deployment sets to reflect any changes to the repository. In some implementations, management actions performed in the repository and manifest of master deployment sets may be logged and automatically reported to various administrators, regulators, or other users (e.g., by email).

Figure 5:
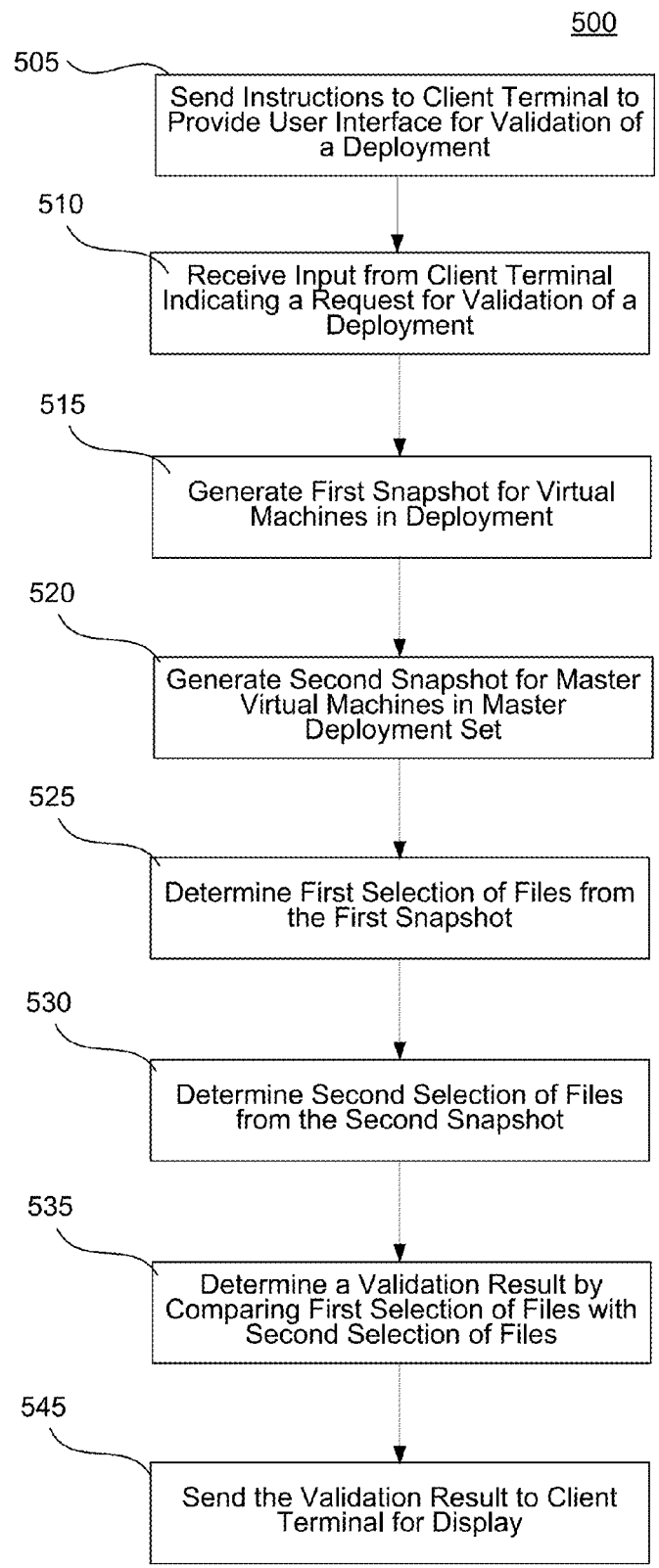
FIG. 5 shows a flow diagram of an example of a method for providing validation of a deployment as an on-demand service, performed according to some implementations.

FIG. 5 shows a flow diagram of an example of a method 500 for providing validation of a deployment as an on-demand service, performed according to some implementations. In block 505, the one or more validation servers 207 send instructions to a client terminal 101 to provide a user interface. Examples of user interfaces include the cloud system service main interface 300 in FIG. 3 and the deployment validation interface 400 of FIGS. 4A and 4B. The user interface may be communicatively connected with an input device 123 on the client terminal to receive input from the authorized user. The client terminal further includes, as noted, the display device 122 for displaying the user interface.

In block 510, the one or more validation servers 207 receive input from the user interface of the client terminal 101 indicating a request for validation of a deployment, such as deployment 114 shown in FIG. 1. In this example, the deployment includes the one or more virtual machines 115 deployed to the component servers 208.

In block 515, one or more microprocessors accessible to or within the one or more validation servers 207 generate a first snapshot of each virtual machine in the deployment. The first snapshot captures the state of the virtual machines 115 in runtime and stores the data in a set of files, all without interrupting virtual machine operations. The files in the first snapshot may embody casino management software components and/or gaming software components. At least some of these files may need to be validated for regulatory compliance.

In block 520, the one or more microprocessors generate a second snapshot for each master virtual machine, such as master virtual machines 109 shown in FIG. 1, in the master deployment set 107 that corresponds with the deployment 114 being validated. The master deployment set resides in one or more data sources 209 accessible to the one or more validation servers 207. The deployment 114 is an instance of the master deployment set 107, and the virtual machines 115 within the deployment 114 are an instance of the master virtual machines 112 within the master deployment set 107. The files in the second snapshot may embody casino management software components and/or gaming software components. At least some of these files will need to be compared with corresponding files from the first snapshot to validate the deployment.

In block 525, a first selection of files from the first snapshot is determined using a manifest of files of regulatory importance 108 stored within the master deployment set 107. In block 530, a second selection of files from the second snapshot is determined using the manifest of files of regulatory importance stored within the master deployment set. The manifest of files of regulatory importance includes a listing of files, corresponding to files within the first snapshot and the second snapshot, which need to be validated for regulatory compliance. Typically, important files such as .exe and .dll files are included for validation, whereas unimportant files like configuration and log files are not.

In block 535, a validation result is determined by comparing, for each of the one or more virtual machines 115 and corresponding virtual gaming machines 109, the first selection of files with the second selection of files. The deployment 114 of the master deployment set 107 should not change any file of regulatory importance. Therefore, a deployment is valid when the first selection of files matches the second selection of files for all virtual machines. In block 545, the validation result is sent to the client terminal 101 for display.

In some implementations, determining the validation result in block 535 includes using a bitwise comparison of the first selection of files with the second selection of files. In other implementations, block 535 further includes creating signatures for the first selection of files and the second selection of files using a secure hashing algorithm and a validation seed, and performing a comparison of the signatures.

Hashing algorithms map larger sets of variable sized input data into a smaller set of output data, such as a fixed-size string of bits. Hashing differing sets of input data results in different sets of output data, thereby making file comparisons faster and more efficient because less computational resources are needed. Converting the output data into signatures using the validation seed establishes a chain of trust for the validation as may be required by regulatory requirements. Examples of secure hashing algorithms which perform hashing and signature creation include HMAC-SHA1, HMAC-SHA256, HMAC-SHA512, HMAC-MD5 and public key cryptography.

Figure 6A:
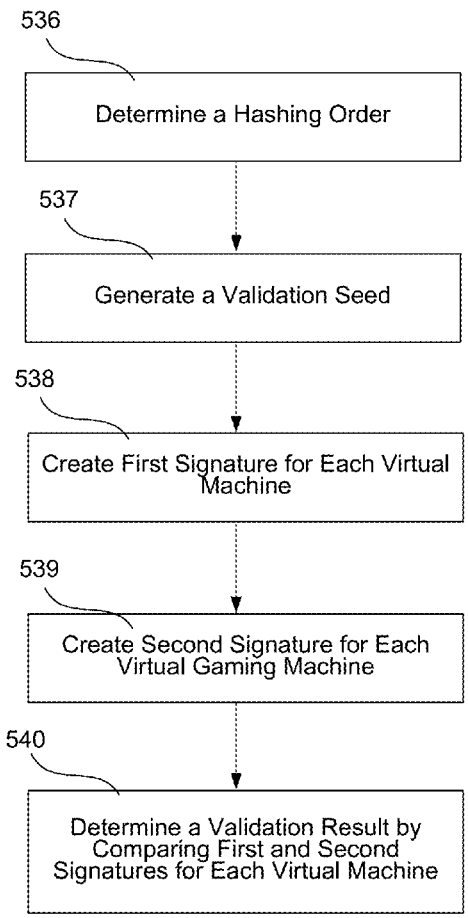
FIG. 6A shows a flow diagram of an example of block 545 of the method of FIG. 5, performed according to some implementations.
Figure 6B:
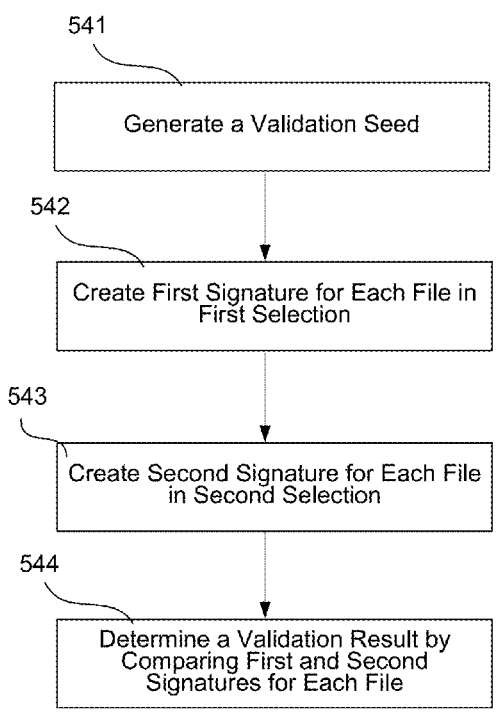
FIG. 6B shows a flow diagram of an example of block 545 of the method of FIG. 5, performed according to some implementations.

FIGS. 6A and 6B shows flow diagrams of other implementations of the block 545 of the validation method 500. In block 536 of FIG. 6A, the validation servers 207 determine a hashing order for the first selection of files and the second selection of files using the manifest of files of regulatory importance 108. In block 537, the one or more validation servers generate a validation seed. The validation seed is in some implementations unique or generated randomly each time validation method 500 is performed.

In block 538, a first signature is created for each virtual machine 115 in the deployment 114. In some implementations, block 538 includes hashing across each file in the first selection of files in the hashing order determined in block 536 and then applying the validation seed to create the first signature. In block 539, a second signature is created for each master virtual machine 109 in the master deployment set 107. In some implementations, block 539 includes hashing across each file in the second selection of files in the hashing order determined in block 536 and then applying the validation seed to create the second signature. A validation result for the deployment is determined in block 540 of FIG. 6A by comparing, for each virtual machine 115 and corresponding master virtual machine 109, the first signature with the second signature. A deployment is valid when the first signature matches the second signature for all virtual machines.

In some implementations, an invalid deployment may be corrected by redeploying the master deployment set. The redeployment may be performed at the direction of an attendant operator or automatically after the deployment is determined to be invalid. In another implementation, virtual machines causing the invalid deployment may be disabled either automatically or by an operator.

In the implementation of block 535 of the validation method 500 shown in FIG. 6B, a validation seed is generated in block 541. In block 542, a first signature is created for each file in the first selection of files for each virtual machine 115 in the deployment 114. In some implementations, block 542 includes hashing across each file in the first selection of files and then applying the validation seed to create the first signature for each file in the first selection. In block 543, a second signature is created for each file in the second selection of files for each master virtual machine 109 in the master deployment set 107. In some implementations, block 543 includes hashing across each file in the second selection of files and then applying the validation seed to create the second signature for each file in the second selection. A validation result for the deployment is determined in block 544 of FIG. 6B by performing a bitwise comparison, for each virtual machine 115 and corresponding master virtual machine 109, between the signature for each file in the first selection of files with the corresponding signature for each file in the second selection of files. A deployment is valid when, for each virtual machine and corresponding master virtual machine, the first signature for each file in the first selection of files matches the second signature for each corresponding file in the second selection of files.

The advantage of creating a signature for each file in the first selection of files and the second selection of files under the method shown in FIG. 6B is that it is possible to determine which individual files caused an invalid deployment. A listing of the individual files can then be sent from the validation server to the client terminal for display in block 545 of FIG. 5. The advantage of creating a signature for each virtual machine and corresponding master virtual machine under the method shown in FIG. 6A is that it takes less computing resources. The disadvantage is that while the authorized user will know which virtual machines were invalidly deployed, he may not necessarily know which files caused the invalid deployment.

In yet another implementation, a first signature is created for a deployment by hashing virtual machines in a second hashing order and a second signature is created for the corresponding master deployment set by hashing master virtual machines in the second hashing order. This method takes the least amount of computing resources but only indicates whether the entire deployment is valid or invalid.

Figure 7A:
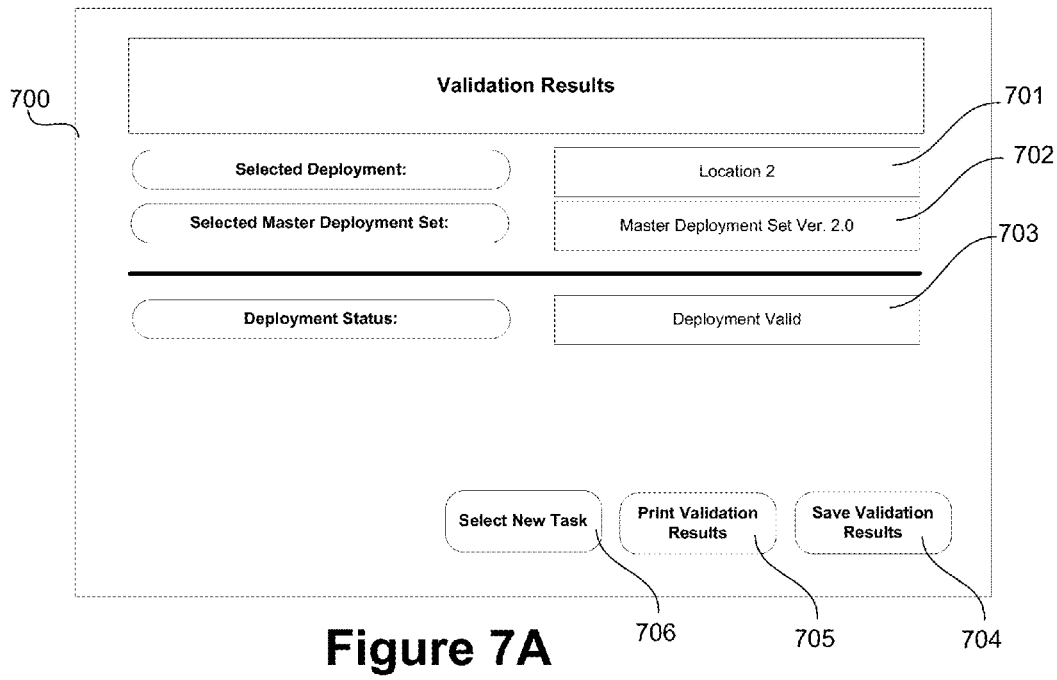
FIGS. 7A and 7B show a validation results interface, according to some implementations.
Figure 7B:
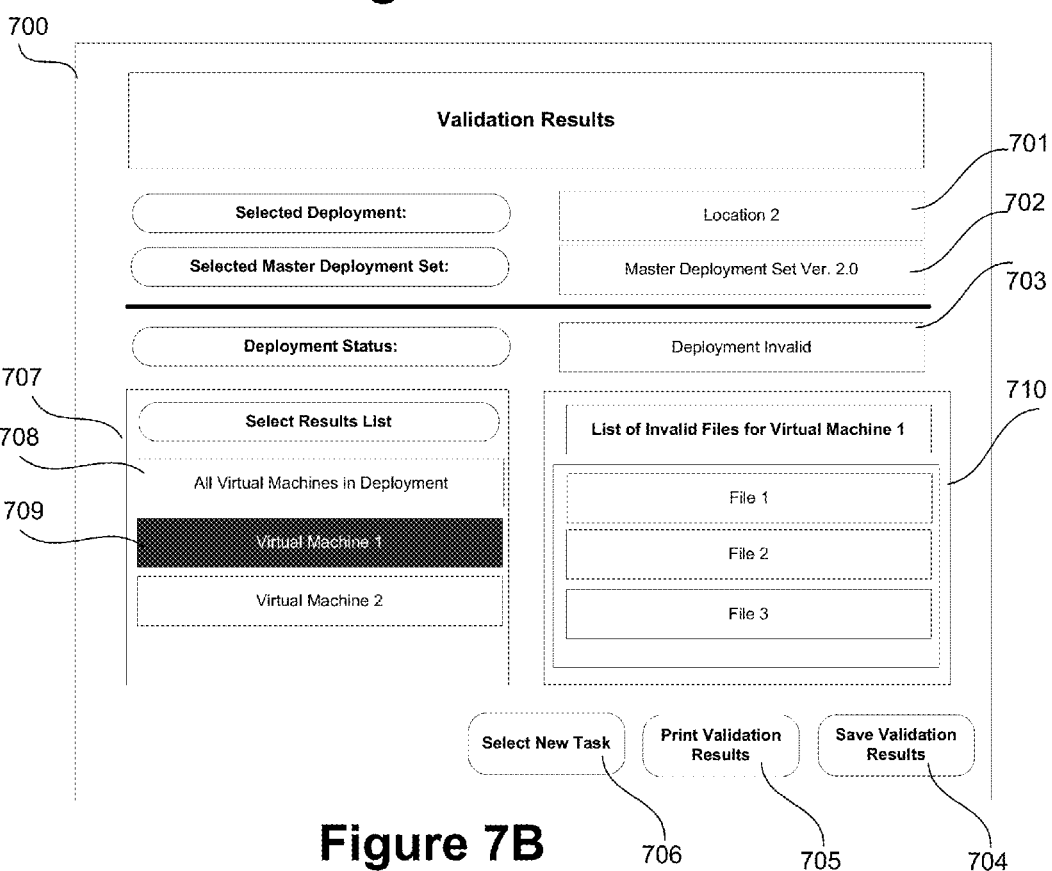

FIGS. 7A and 7B show examples of a validation results interface 700, in accordance with some implementations. In some implementations, the validation results interface is a graphical user interface. The validation results interface may be displayed on the display device 122 of the client terminal 101. Selected deployment display box 701 corresponds with the authorized user-selected location 2 404 from the deployment validation interface 400 of FIG. 4A. Selected master deployment set display box 702 corresponds with the authorized user-selected master deployment set version 2.0 406 from the deployment validation interface 400 of FIG. 4A. Deployment status display box 703 shows an example display for when the deployment is determined to be valid. The authorized user may return to the cloud system service main interface 300 by choosing select new task button 706, print validation results to a networked or remote printer by choosing print validation results button 705, or save the validation results to a file by choosing save validation results button 704.

FIG. 7B shows an example of the validation results interface 700 when the deployment is determined to be invalid. Deployment status display box 703 indicates that the deployment is invalid. In addition, search results list box 707 populates with a list of all virtual machines within the deployment. The authorized user may select a virtual machine, such as by choosing virtual machine 1 709, which then populates an invalid files list box 710 with a list of invalid files for the chosen virtual machine. The authorized user may select all virtual machines in deployment 708, which then populates invalid files list box 710 with a list of invalid files for all virtual machines in the deployment.

In some implementations, the cloud system service further provides for comparative results of the success and failure rates of deployments. The results may be stored in the one or more data sources 209. In one example, an authorized user may use the client terminal 101 to retrieve the stored results. The results may be provided in various formats. For instance, the success and failure rates of deployments may be sorted by master deployment set, by location of deployment, by the subscriber of the component services, or the like.

Figure 8:
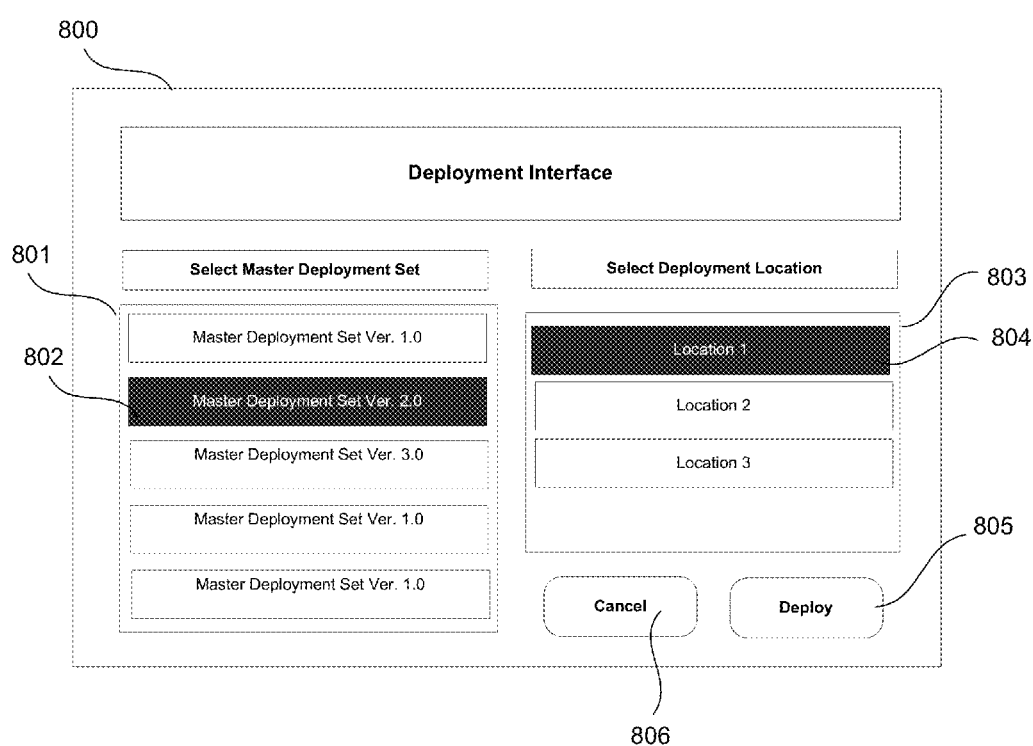
FIG. 8 shows a deployment interface, according to some implementations.

FIG. 8 shows an example of a deployment interface 800, configured in accordance with some implementations. Instructions for displaying the deployment interface 800 may be sent from the one or more validation servers 207 to the client terminal 101 responsive to the authorized user selecting deploy master deployment set 303 and choosing proceed button 304 in the cloud system service main interface 300 of FIG. 3. The deployment interface 800 allows the authorized user to deploy master deployment sets to the one or more component servers 208. The deployment interface 800 includes master deployment set list box 801 which can be populated with the manifest of master deployment sets 106 stored in one or more data sources 209 and accessible to the one or more validation servers 207. In the example shown in FIG. 8, master deployment set version 2.0 802 is chosen, which populates location selection box 803 with a listing of locations for deployment. In some implementations, each location is served by one or more component servers.

In some implementations, each location is served by a single component server. In other implementations, a single component server may provide game play to multiple locations. The authorized user may select a location to deploy the chosen master deployment set, such as a location 1 804 as shown in FIG. 8. After selecting the master deployment set and location, the authorized user may deploy by choosing deploy button 805. In other implementations, box 803 is a component server selection box, and the authorized user may perform the deployment by choosing one or more component servers rather than by choosing by location.

In some implementations, the authorized user may return to the cloud system service main interface 300 by choosing a cancel button 806.

Figure 9:
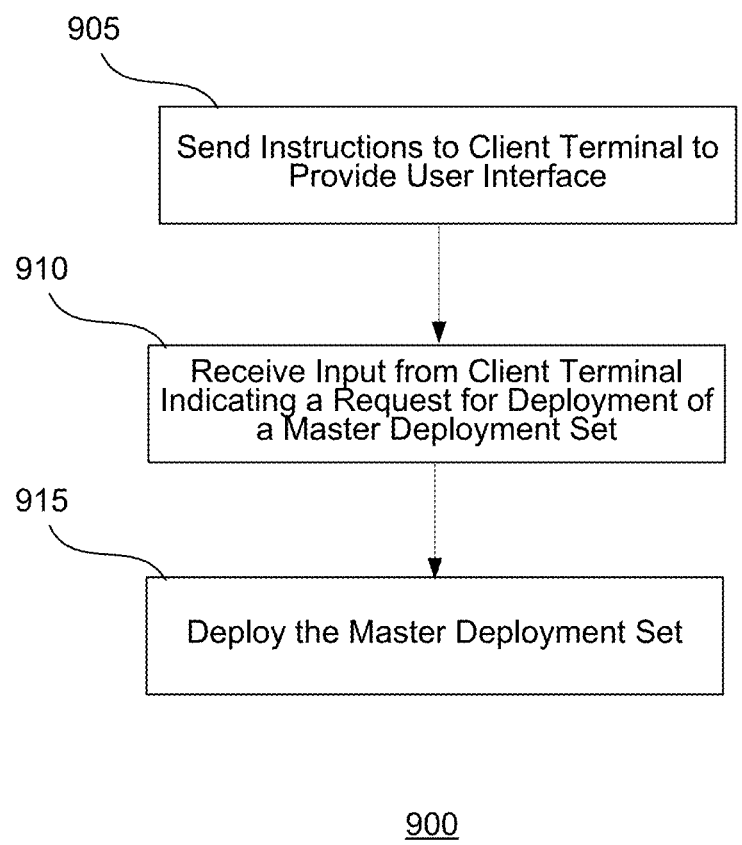
FIG. 9 shows a flow diagram of an example of a method for providing a deployment of a master deployment set, performed according to some implementations.

FIG. 9 shows a flow diagram of an example of a method 900 for providing a deployment of a master deployment set, performed in accordance with some implementations. In block 905, the one or more validation servers 207 send instructions to the client terminal 101 to provide a deployment interface, such as the deployment interface 800 in FIG. 8. In block 910, the one or more validation servers 207 receive input from the client terminal 101 indicating a request for deployment of a master deployment set. In block 915, the one or more validation servers 207 deploy the master deployment set to the one or more component servers 208 in FIG. 2 according to directions from the input of block 910.

In some implementations, deploying a master deployment set includes creating a cloned copy of the master deployment set. The cloned copy may then be deployed to the one or more component servers 208. Once a master deployment set is deployed, gaming machine client terminal 121 may access the component service 113 via the component servers.

Figure 10:
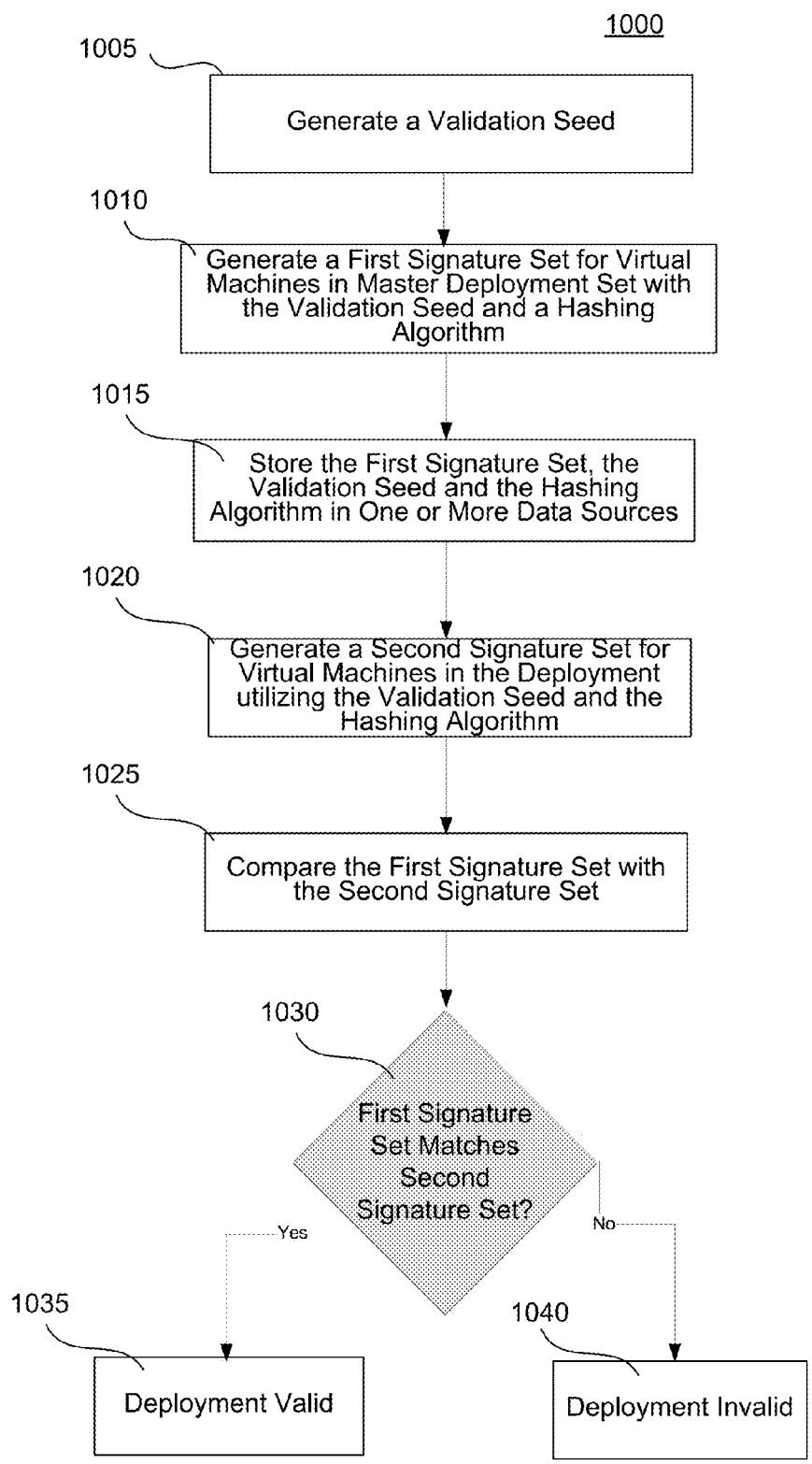
FIG. 10 shows a flow diagram of an example of a method 1000 for providing validation of a deployment as an on-demand service, performed according to some implementations.

FIG. 10 shows a flow diagram of an example of a method 1000 for providing validation of a deployment as an on-demand service, performed according to some implementations. In some implementations, the validation seed is generated one time for each master deployment set and stored in the one or more data sources accessible by the one or more validation servers. Signatures are created using the secure hashing algorithm for the master deployment set and stored for future comparisons with deployments. A deployment of the master deployment set may be validated using the stored validation seed and the secure hashing algorithm. The validation of the deployment may be performed by an authorized user or may run as an unattended process.

In block 1005, a validation seed is generated. In block 1010, a first signature set for the virtual machines in a master deployment set is generated using the validation seed and the secure hashing algorithm. The first signature set may be generated using the techniques discussed above regarding the method 500. Also as discussed above, there may be a unique signature for each virtual machine in the master deployment set, for each file having regulatory importance on each virtual machine in the master deployment set, or a single signature for each master deployment set, in various implementations.

In block 1015, the first signature set, the validation seed, and the secure hashing algorithm are stored the one or more data sources. Once stored, future deployments may be validated using the stored first signature set, validation seed and secure hashing algorithm without having to perform the blocks 1005 and 1010 for each validation of the future deployments.

In block 1020, a second signature set is generated for the virtual machines in a deployment of the master deployment set using the stored validation seed and secure hashing algorithm. The second signature set may also be generated using the techniques discussed above regarding the method 500. Also as discussed above, there may be a unique signature for each machine in the deployment set, for each file having regulatory importance for each virtual machine in the deployment, or a single signature for each deployment, in various implementations. Nonetheless, the chosen technique used for generating the first signature set for the master deployment set in the block 1010 should also be used to generate the second signature set for the deployment in the block 1020.

In some implementations, the blocks 1020 and 1025 may be performed immediately after a deployment and periodically thereafter to ensure that the virtual machines in the deployment have not been corrupted or modified. In some implementations, these steps may be performed by the attended use of an authorized user, such as an administrator or a regulator. For instance, the authorized user may use the deployment validation interface 400 shown in FIGS. 4A and 4B. In some implementations, the steps may be performed automatically at various times as configured by the authorized user. In some implementations, the steps may be performed automatically on a reboot of a validation server.

In block 1025, the first signature set is compared with the second signature set. In block 1030, if the first signature set matches the second signature set, the deployment is valid. In block 1035, the valid deployment may be logged or stored in the database system or sent to an administrator (e.g., by email). If the first signature set does not match the second signature set, the deployment is invalid. In block 1040, the invalid deployment, including a list of invalid files, may be logged or stored in the database system or sent to an administrator. A regulator or remote regulating entity may be notified. In addition, the virtual machines in the deployment may be disabled, redeployed or rolled back to an earlier version.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method comprising:
receiving a request to validate a deployment of one or more virtual machines; and
responsive to receiving the request to validate:
(a) generating, via at least one processor and for each of a selected one or more virtual machines of the one or more virtual machines in the deployment, a deployment snapshot, the deployment snapshot including a first set of files;
(b) generating, via the at least one processor and for each of a corresponding one or more master virtual machines in a master deployment set, a master snapshot, the master snapshot including a second set of files, wherein the deployment includes one or more virtual machines deployed to one or more component servers, wherein each of the selected one or more virtual machines in the deployment are an instance of each of the corresponding one or more master virtual machines in the master deployment set, the master deployment set being stored in one or more data sources communicatively coupled with the one or more validation servers, the master deployment set further including a manifest of files of regulatory importance, wherein the manifest of files of regulatory importance is configured to incorporate jurisdictional data for one or more jurisdictions, thereby enabling the master deployment set be deployed to the one or more component servers providing a component service to one or more gaming machine client terminals in the one or more jurisdictions;
(c) determining, via the at least one processor and for each of the selected one or more virtual machines, a first selection of files from the deployment snapshot, the first selection of files determined by using the manifest of files of regulatory importance;
(d) determining, via the at least one processor and for each of the corresponding one or more master virtual machines, a second selection of files from the master snapshot, the second selection of files determined by using the manifest of files of regulatory importance;
(e) generating, via the at least one processor, a validation seed;
(f) creating, via the at least one processor and for each of the one or more selected virtual machines, a signature for each file in the first selection of files using the validation seed at least in part by hashing each file of the first selection of files with a secure hashing algorithm;
(g) creating, via the at least one processor and for each of the corresponding one or more master virtual machines, a signature for each file in the second selection of files using the validation seed at least in part by hashing each file of the second selection of files with a secure hashing algorithm; and
(h) determining, via the at least one processor, whether the deployment is valid by comparing, for each of the selected one or more virtual machines and each of the corresponding one or more master virtual machines, the signature for each file in the first selection of files with the corresponding signature for each file in the second selection of files.

2. The computer-implemented method of claim 1, wherein the one or more selected virtual machines and the corresponding one or more master virtual machines include one or more casino management software components.

3. The computer-implemented method of claim 2, wherein the master deployment set represents one version of the one or more casino management software components, the master deployment set indexed by a manifest of master deployment sets, and the manifest of master deployment sets stored in the one or more data sources.

4. The computer-implemented method of claim 1, the method further comprising:
providing a casino management service from the one or more component servers to a gaming machine client terminal.

5. The computer-implemented method of claim 1, wherein the one or more selected virtual machines and the corresponding one or more master virtual machines include one or more gaming software components.

6. The computer-implemented method of claim 5, wherein the master deployment set represents one version of the one or more gaming software components, the master deployment set indexed by a manifest of master deployment sets, and the manifest of master deployment sets stored in the one or more data sources.

7. The computer-implemented method of claim 5, the method further comprising:
providing a gaming service from the one or more component servers to a gaming machine client terminal.

8. The computer-implemented method of claim 1, the method further comprising:
sending instructions from one or more validation servers to a client terminal, the client terminal including a display device and an input device, the instructions providing a user interface, the user interface configured to receive input from the input device and be displayed on the display device;
receiving input from the user interface of the client terminal at the one or more validation servers, the input indicating the request to validate the deployment; and
sending a validation result indicating whether the deployment is valid to the client terminal for display.

9. The computer-implemented method of claim 8, the method further comprising:
responsive to determining the deployment to be invalid, sending a list of files to the client terminal for display, the list of files including files causing the deployment to be invalid.

10. The computer-implemented method of claim 8, the method further comprising:
displaying the validation result on the user interface of the client terminal, wherein the user interface is a graphical user interface.

11. The computer-implemented method of claim 1, the method further comprising:
storing a validation result indicating whether the deployment is valid in the one or more data sources.

12. The computer-implemented method of claim 1, the method further comprising:
sending a validation result indicating whether the deployment is valid to a regulatory entity or an administrator.

13. The computer-implemented method of claim 1, the method further comprising:
receiving input at the one or more validation servers from a client terminal indicating a request for deployment of a master deployment set; and
deploying the master deployment set on the one or more component servers responsive to receiving the input indicating a request for deployment of the master deployment set.

14. The computer-implemented method of claim 1, the method further comprising:
responsive to determining the deployment to be invalid, disabling one or more virtual machines in the deployment causing the deployment to be invalid.

15. The computer-implemented method of claim 1, the method further comprising:
responsive to determining the deployment result to be invalid, redeploying one or more virtual machines in the deployment causing the deployment result to be invalid.

16. The computer-implemented method of claim 1, the method further comprising:
displaying a success rate or a failure rate for one or more deployments of the master deployment set on the user interface of the client terminal.

17. A system comprising:
(a) one or more data sources configured to store one or more master deployment sets, a master deployment set including:
(i) one or more master virtual machines, the one or more master virtual machines configured to have a master snapshot taken, and a manifest of files of regulatory importance;
(b) one or more component servers configured to host at least one deployment of a master deployment set, the at least one deployment including:
(i) one or more virtual machines, wherein the one or more virtual machines are one instance of corresponding one or more master virtual machines within the master deployment set, the one or more virtual machines configured to have a deployment snapshot taken; and
(c) one or more validation servers configured to receive a request to validate the at least one deployment of the one or more virtual machines and, responsive to receiving the request to validate:
(i) generate, for each of a selected one or more virtual machines in the at least one deployment, the deployment snapshot, the deployment snapshot including a first set of files,
(ii) generate, for each of a corresponding one or more master virtual machines in the master deployment set corresponding with the at least one deployment, the master snapshot, the master snapshot including a second set of files,
(iii) determine, for each of the selected one or more virtual machines in the at least one deployment, a first selection of files from the deployment snapshot, the first selection of files determined by using the manifest of files of regulatory importance,
(iv) determine, for each of the corresponding one or more master virtual machines in the master deployment set corresponding with the at least one deployment, a second selection of files from the master snapshot, the second selection of files determined by using the manifest of files of regulatory importance,
(v) generate a validation seed;

(vi) create, for each of the selected one or more virtual machines in the at least one deployment, a signature for each file in the first selection of files using the validation seed at least in part by hashing with a secure hashing algorithm the first selection of files;

(vii) create, for each of the one or more corresponding master virtual machines in the master deployment set corresponding with the at least one deployment, a signature for each file in the second selection of files using the validation seed at least in part by hashing with the secure hashing algorithm the second selection of files; and (viii) determine whether the at least one deployment is valid by comparing, for each of the one or more selected virtual machines in the at least one deployment and the corresponding one or more master virtual machines in the master deployment set corresponding with the at least one deployment, the signature for each file in the first selection of files with the corresponding signature for each file in the second selection of files, wherein the manifest of files of regulatory importance is configured to incorporate jurisdictional data for one or more jurisdictions, thereby enabling the master deployment set to be deployed to the one or more component servers, the one or more component servers providing a component service to one or more gaming machine client terminals in the one or more jurisdictions.

18. The system of claim 17, wherein the one or more selected virtual machines in the at least one deployment and the one or more corresponding master virtual machines in the master deployment set corresponding with the at least one deployment include one or more casino management software components.

19. The system of claim 18, wherein the master deployment set represents one version of the one or more casino management software components, the master deployment set indexed by a manifest of master deployment sets, and the manifest of master deployment sets stored in the one or more data sources.

20. The system of claim 17, wherein the one or more component servers are configured to:
provide a casino management service to a gaming machine client terminal.

21. The system of claim 17, wherein the one or more selected virtual machines in the at least one deployment and the one or more corresponding master virtual machines in the master deployment set corresponding with the at least one deployment include one or more gaming software components.

22. The system of claim 21, wherein the master deployment set represents one version of the one or more gaming software components, the master deployment set indexed by a manifest of master deployment sets, and the manifest of master deployment sets stored in the one or more data sources.

23. The system of claim 17, wherein the one or more component servers are configured to:
provide a gaming service to a gaming machine client terminal.

24. The system of claim 17, wherein the one or more validation servers are further configured to:
send instructions to a client terminal including a display device and an input device, the instructions providing a user interface, the user interface configured to receive input from the input device and be displayed on the display device;
receive input from the user interface of the client terminal, the input indicating the request to validate the at least one deployment; and
send a validation result indicating whether the deployment is valid to the client terminal for display.

25. The system of claim 24, wherein the one or more validation servers are further configured to:
responsive to determining the deployment to be invalid, send a list of files to the client terminal for display, the list of files including files causing the deployment to be invalid.

26. The system of claim 24, wherein the one or more validation servers are further configured to:
display the validation result on the user interface of the client terminal, wherein the user interface is a graphical user interface.

27. The system of claim 17, wherein the one or more validation servers are further configured to:
store a validation result indicating whether the deployment is valid in the one or more data sources.

28. The system of claim 17, wherein the one or more validation servers are further configured to:
send a validation result indicating whether the deployment is valid to a regulatory entity or an administrator.

29. The system of claim 17, wherein the one or more validation servers are further configured to:
receive input from a client terminal indicating a request for deployment of a master deployment set; and
deploy the master deployment set on the one or more component servers responsive to receiving the input indicating a request for deployment of the master deployment set.

30. The system of claim 17, wherein the one or more validation servers are further configured to:
responsive to determining the deployment to be invalid, disable one or more virtual machines in the deployment causing the deployment to be invalid.

31. The system of claim 17, wherein the one or more validation servers are further configured to:
responsive to determining the deployment to be invalid, redeploy one or more virtual machines in the deployment causing the deployment to be invalid.

32. The system of claim 17, wherein the one or more validation servers are further configured to:
display a success rate or a failure rate for one or more deployments of the master deployment set on the user interface of the client terminal.

* * * * *